United States Patent [19]
Brenner et al.

[11] Patent Number: 5,960,440
[45] Date of Patent: Sep. 28, 1999

[54] KITCHEN INFORMATION AND DATABASE MANAGEMENT METHOD AND APPARATUS

[75] Inventors: Richard K. Brenner, Fanwood, N.J.; David S. Register, Austin, Tex.

[73] Assignee: Brother International Corporation, Bridgewater, N.J.

[21] Appl. No.: 08/586,403

[22] Filed: Jan. 16, 1996

[51] Int. Cl.$^6$ .................................................. G06F 17/30
[52] U.S. Cl. ......................................... 707/104; 364/400
[58] Field of Search .................................. 364/400, 715, 364/715.05, 715.011, 709.03; 707/103, 104

[56] References Cited

U.S. PATENT DOCUMENTS

| | | | |
|---|---|---|---|
| 4,100,602 | 7/1978 | Shapiro | 364/715.05 |
| 4,405,991 | 9/1983 | Stanley | 364/715 |
| 4,503,502 | 3/1985 | Chapin | 364/400 |
| 4,807,169 | 2/1989 | Overbeck | 364/715.011 |
| 4,837,414 | 6/1989 | Edamula | 219/714 |
| 4,872,112 | 10/1989 | Hungerford | 364/400 |
| 5,101,386 | 3/1992 | Kaplan | 364/715.05 |
| 5,877,477 | 3/1999 | Petty et al. | 219/506 |

FOREIGN PATENT DOCUMENTS

| | | |
|---|---|---|
| A-55-66050 | 5/1980 | Japan . |
| A-56-137022 | 10/1981 | Japan . |

OTHER PUBLICATIONS

Simpson, Alan, Mastering WordPerfect 5.1 for Windows, Copyright 1992 Sybex Inc. pp. 28–29, 60.

"Nucleus: Sofware Received," *Byte*, Oct. 1982, McGraw–Hill, Inc., p. 467.

Carole Sugarman, "Cooking by Computer," *The Washington Post*, Oct. 28, 1984, p. D4.

"Kitchen Computing," *The COOK's Magazine*, Jan./Feb. 1985, pp. 66–69.

"On Your Computer," *Changing Times*, Dec. 1985, pp. 78–81.

Erik Sandberg–Diment, "Personal Computers: The Culinary Glitch", *The New York Times*, Nov. 9, 1982, p. C4.

Terence F. Dicker, *Computer Programs for the Kitchen*, 1984, pp. 89–126 with Table of Contents.

Carole Sugarman, "Kitchen Software: Will the Computer Age Eclipse the Cookbook?," *The Washington Post*, Nov. 30, 1983, p. E1.

Introduction pamphlet to "Multimedia Micro Kitchen Companion" computer program, Lifestyle Software Group, 8 pp., 1995.

Introduction pamphlet to "Multimedia On the Menu" computer program, Pinpoint Publishing (1994), pp. 1–88.; 1990. Merlin product article with translation, Provaltec AG, 18 pp.

*Primary Examiner*—Edward R. Cosimano
*Attorney, Agent, or Firm*—Oliff & Berridge, PLC

[57] ABSTRACT

A device that manages kitchen information, including an information storage device that stores a plurality of recipes, a display device that displays at least one of the plurality of recipes stored in the information storage device and a microcontroller that selects at least one of the plurality of recipes having a main recipe and at least one subsidiary recipe, where the subsidiary recipe being a scaled version of the main recipe. The display device can further display at least one of the plurality of recipes including a cooking time associated with the recipe and one or more timers. By selecting a timer, the microcontroller automatically sets the selected timer equal to the associated cooking time.

19 Claims, 5 Drawing Sheets

KITCHEN INFORMATION AND DATABASE MANAGEMENT METHOD AND APPARATUS

This invention is related to the inventions described in and claimed in U.S. patent applications Ser. No. 08/585,738 (Attorney Docket No. JAO 30911; now abandoned), Ser. No. 08/585,560 (Attorney Docket No. JAO 30913; now pending), Ser. No. 08/585,734 (JAO 30914; now U.S. Pat. Ser. No. 5,786,983), Ser. No. 29/049,044 (Attorney Docket No. JAO 30915; now U.S. Pat. No. D377,340), Ser. No. 29/049,045 (Attorney Docket No. JAO 30916; now U.S. Pat. No. D376,354), Ser. No. 29/048,948 (Attorney Docket No. JAO 30917; now U.S. Pat. No. D375,947), and Ser. No. 29/048,962 (Attorney Docket No. JAO 30918; now U.S. Pat. No. D390,540).

BACKGROUND OF THE INVENTION

1. Field of the Invention

This invention is directed to a method and apparatus for managing kitchen information.

2. Description of the Related Art

Typically, kitchen information is compiled and presented in either cookbooks or complicated programs to be run on a general purpose personal computer. As such, neither are perfectly suitable when used in the kitchen.

Cookbooks are often poorly or inappropriately organized and/or indexed. Furthermore, they are usually limited to a single cuisine, level of cooking skill, or type of meal. Thus, to cook a single meal having a number of dishes, a variety of cookbooks must be used. Additionally, cookbooks often become soiled with food when used in a kitchen, and are thus unhygienic.

Cookbook programs, on the other hand, are difficult to use while cooking as few people keep computers in the kitchen. Thus, it is usually necessary to print out the recipes to be used for a particular meal. Furthermore, since the computer is not in the kitchen, it is difficult to verify that all of the necessary ingredients of any particular recipe are on hand. In addition, using such cookbook programs is complicated and time consuming for inexperienced computer users.

Thus, there is a need for a device which contains the advantages of cookbooks, including ease of use and portability into and around the kitchen, with the advantage of cookbook programs, including recipe searching and indexing and the ability to incorporate an unlimited number of recipes from different cuisines, recipes having different cooking skill levels and recipes from different meals.

SUMMARY OF THE INVENTION

This invention thus provides a device for managing kitchen information including at least one cookbook database of recipes.

This invention also provides for improved scaling of recipes by providing a main recipe and at least one subrecipe having predetermined scaled ingredient quantities and preparation instructions.

This invention further provides recipe information including cooking time and a device having a timer, where the timer is automatically set based on the recipe cooking time.

This invention additionally provides a device for managing the cookbook databases that allows the user to find any recipe by its main ingredient, category or title.

This invention still further provides a device for managing kitchen information that allows the user to plan daily or weekly meals and generate corresponding shopping lists quickly and easily for one or more selected recipes.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
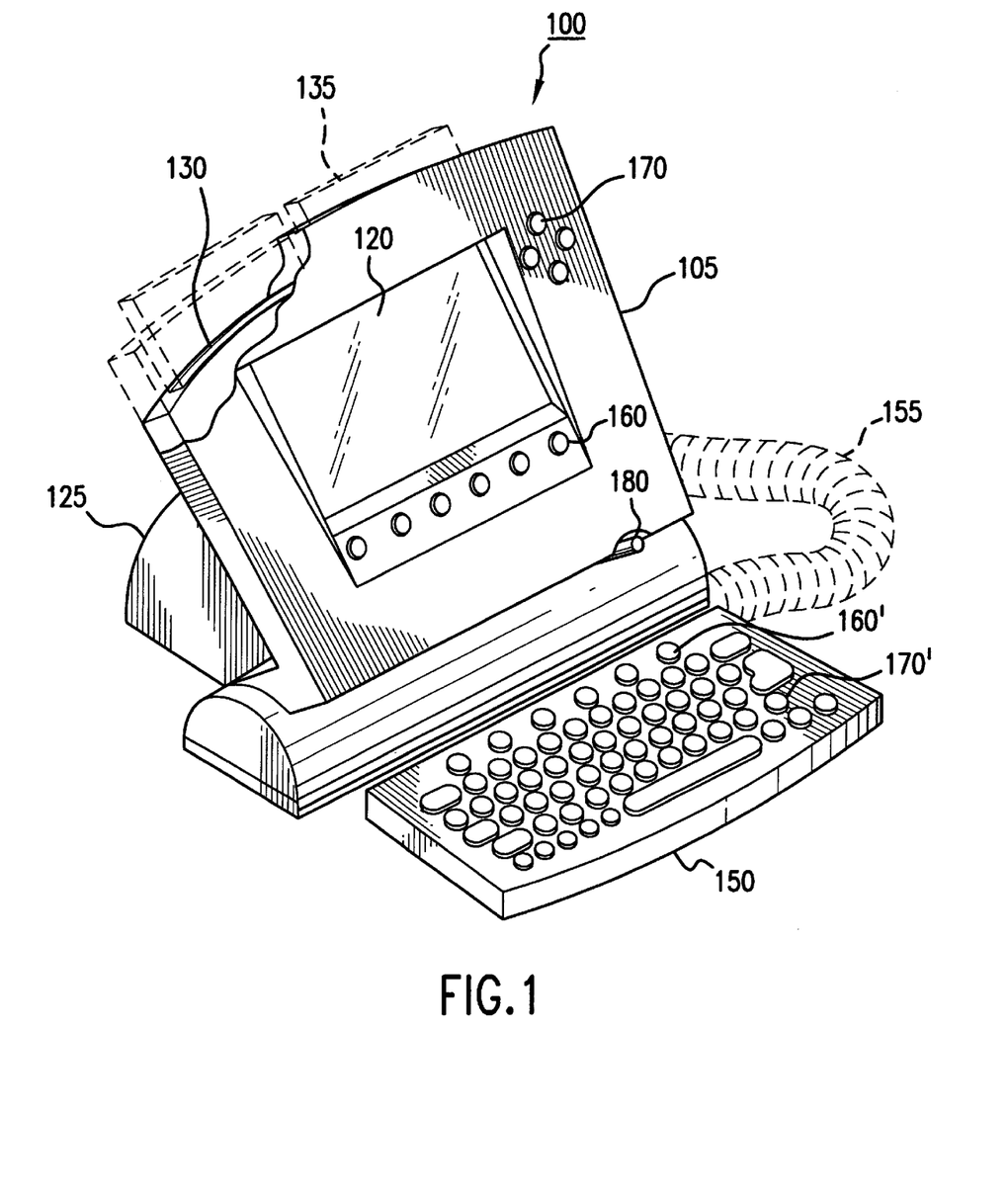
FIG. 1 is a perspective view of a kitchen information management device according to a first embodiment of this invention.

FIG. 1 shows a first preferred embodiment of the kitchen information management device 100 of this invention. As shown in FIG. 1, the kitchen information management device has a housing 105 capable of resting on any flat surface, such as a counter top in a kitchen. The compact size of the housing 105 allows the kitchen information management device to be easily transported about the kitchen and placed anywhere within the kitchen.

The housing 105 includes a display screen 120, a number of variable function keys 160 positioned below the display screen 120 and a number of cursor movement keys 170 positioned to the right of the display screen 120. The housing 105 also includes a printer 125 and a print button 180. The housing 105 further includes a pair of integrated circuit (IC) card ports 130 into which IC data cards 135 can be inserted. The IC data cards contain additional recipe data, and can contain other types of kitchen information, such as information on cooking utensils, or wine and mixology.

A keyboard 150 is permanently attached to the housing 105 by a cable 155. The keyboard 150 has an identical number of variable function keys 160' and a corresponding set of cursor movement keys 170'.

The IC data cards 135 store cookbook data or related food preparation information. The IC data cards 135 are preferably ROM cards having memory chips housed in small (credit-card size) plastic cases. However, any type of removable data storage media and access device can be used in place of the ports 130 and the cards 135. An entire library of ROM cards can be kept in the space of a single traditional cookbook.

The housing 105 is preferably constructed having a small size and a corresponding small footprint, such as 8" wide×5" deep×6.5" high, for the kitchen counter. However, the display screen 120 is preferably relatively large, such as 3"×5", to allow the displayed data to be easily viewed. The display screen 120 is preferably angled for optimum viewing. The set of six display screen variable function keys 160 and four cursor movement keys 170 duplicate the functions of the set of six keyboard variable function keys 160' and four cursor movement keys 170'.Thus, with the exception of data entry, which is performed through the keyboard, all of the variable functions can be accessed through either the variable function keys 160 or 160' and the cursor movement keys 170 or 170'.

Figure 2:
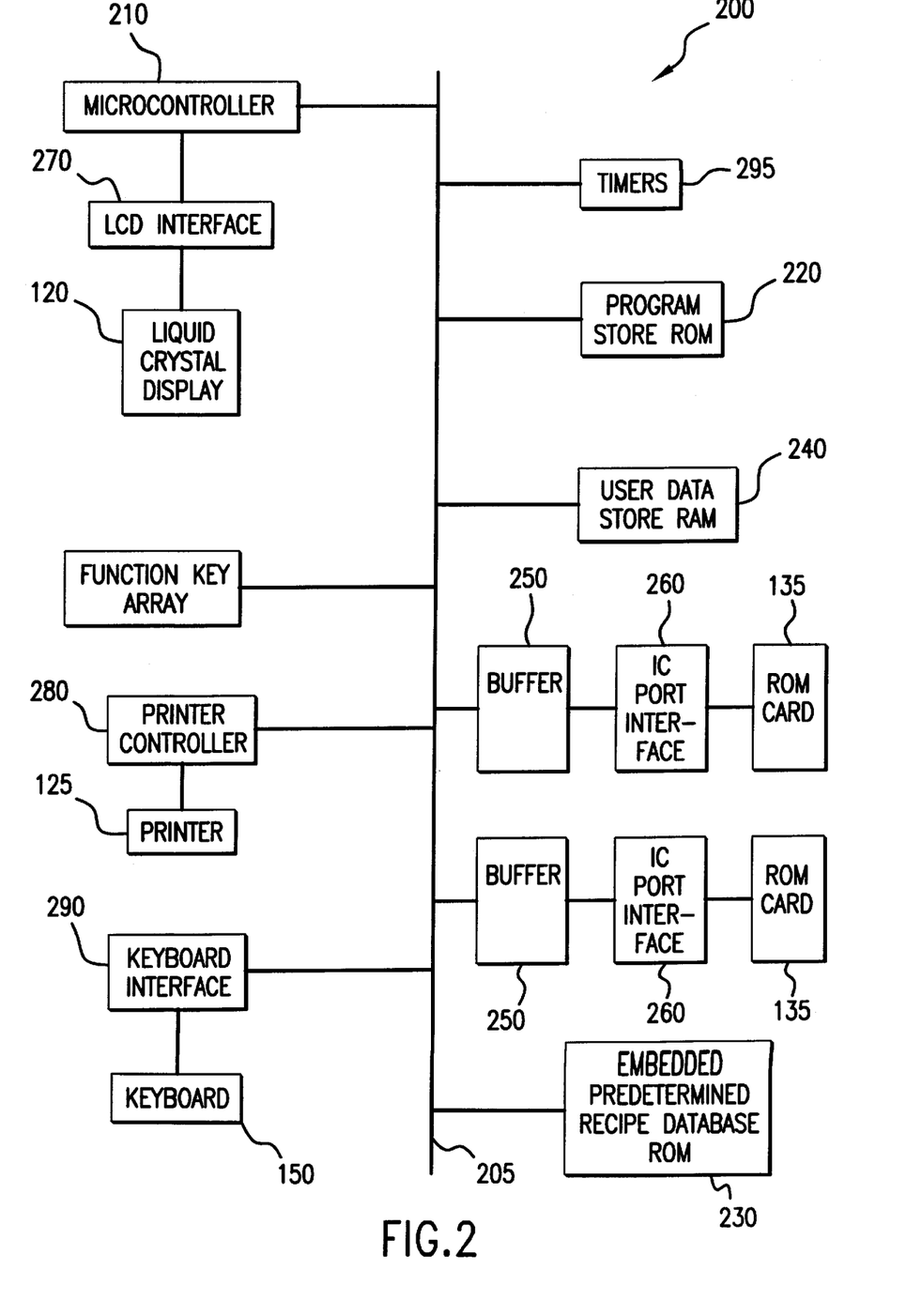
FIG. 2 is a block diagram of the control system of the kitchen information management device of FIG. 1.

FIG. 2 shows one preferred embodiment of a control system 200 of the kitchen information management device 100. As shown in FIG. 2, the control system 200 includes a microcontroller 210. The microcontroller 210 is connected to a system data bus 205 to control the access, manipulation, retrieval, display and printing of the cooking and food preparation information. The internal data storage for the kitchen information management device 100 preferably includes a computer program store ROM 220, an embedded predetermined recipe database ROM 230 and a user data store RAM 240. The data stored in the IC cards 135 is accessible and electrically connected through the IC card ports 130 via an IC port interface 260 and a buffer 250. An LCD interface 270 is connected between the microcontroller 210 and the display screen 120. Also connected to the system data bus 205 are a printer controller 280 and a keyboard interface 290. The printer 125 is connected to the printer controller 280. The keyboard 150 is connected to the keyboard interface 290.

The computer program store 220 preferably includes the required computer programs for operating the kitchen information management device 100.

The predetermined recipe database 230 preferably includes a database of originally selected, developed and tested recipes 300. The predetermined recipe database 230 is continuously available to the user. Likewise, the IC data cards 135 also contain a database of additional originally selected, developed and tested recipes 300.

Figure 3:
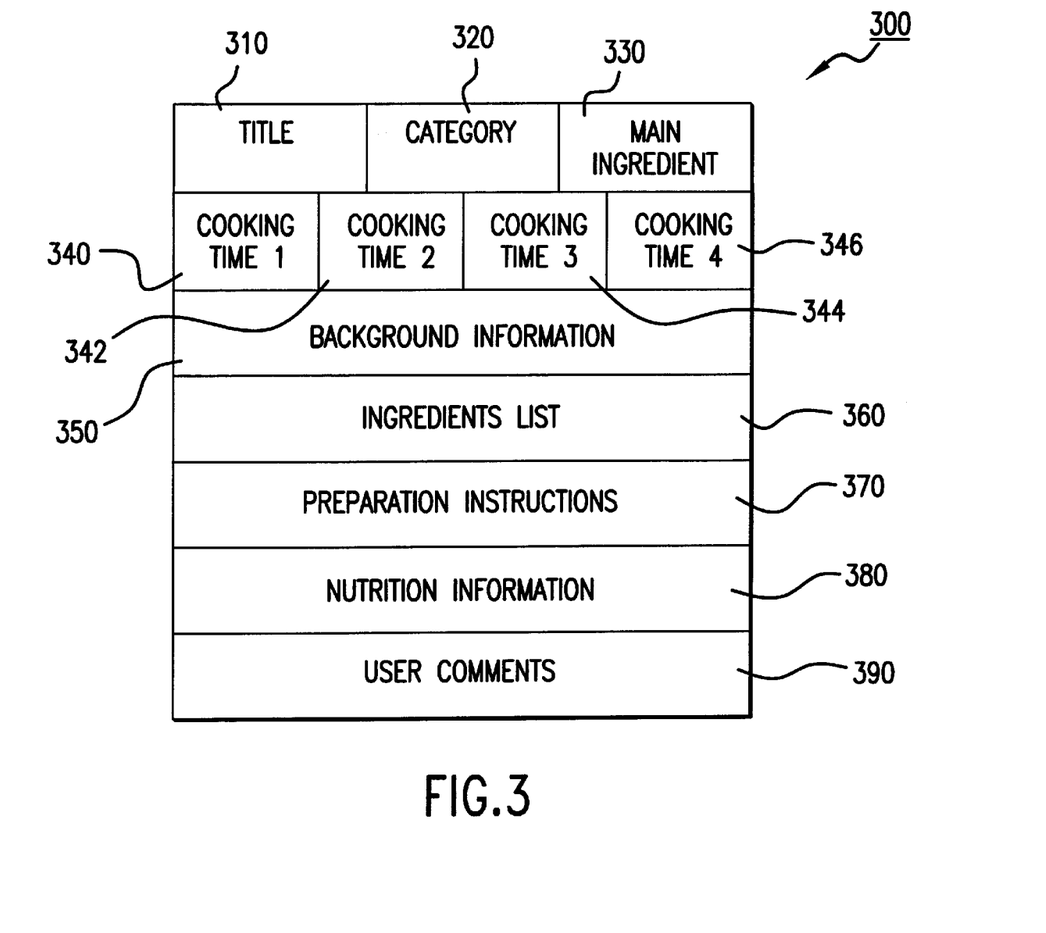
FIG. 3 is a diagram showing the recipe data file.

As schematically shown in FIG. 3, each of the predetermined recipes 300 preferably includes a title 310, a category 320, a main ingredient 330, one or more cooking times 340–346 for cooking one or more parts of the recipe, an introduction with background information about the recipe 350, a list of ingredients 360 including the food items and associated quantities, preparation instructions 370 and nutritional information 380.

In the preferred embodiment, the recipe ingredients list 360 and the preparation instructions 370 are placed into separate fields, each of which can be individually indexed using pointers. Thus, the user can quickly and easily switch between the ingredients list 360 and the preparation instructions 370 for the recipe while the user's place in each is maintained. The user can easily switch back to the ingredients list 360 to check the individual food items and the associated quantities while following the step by step preparation instructions 370 for the recipe 300.

Therefore, the user can easily maintain control over the preparation of the recipe 300 and maintain direct access, with a single button push of one of the variable function keys 160 or 160', to the ingredients to be mixed or to be retrieved from the pantry. The user's orientation (i.e., cursor position) within the preparation instructions 370 is preferably maintained when switching between the ingredients list and preparation instructions. In contrast, the user's cursor position within the ingredients list 360 is preferably returned to the beginning of the ingredients list 360 when switching back to the preparation instructions 370. However, the user's cursor position within the ingredients list 360 can alternatively be maintained when switching between the ingredients list 360 and the preparation instructions 370. Further, by dividing the ingredients list 360 from the preparation instructions 370, the display screen 120 and the housing 105 can be kept small and compact.

In another embodiment, the ingredients list 360 and the preparation instructions can be placed in a single field, with a first pointer positionable only within the ingredients list portion, and a second pointer positionable only within the preparation instructions portion. In this case, as before, the position of the ingredients list pointer is preferably maintained at the beginning of the ingredients list portion, while the preparation instructions pointer is maintained at the user's current cursor position within the preparation instructions portion. Alternatively, as before, the ingredients list pointer can alternately be maintained at the user's current cursor position within the ingredients list portion.

The predetermined recipe database 230 further includes the nutritional information 380 for each recipe. Such information preferably includes one or more of calorie information, fat, sodium, carbohydrates, protein and cholesterol information. Additional nutrition information can also be provided according to specific user requirements. A glossary is also contained within the predetermined recipe database 230. Through the glossary the user accesses a predetermined selection of food preparation terms (e.g., "saute") with the associated definitions and/or concise explanations. This helps inform the user while using the kitchen information management device 100 during food preparation or planning.

In addition, the recipes 300 in the predetermined recipe database 230 preferably include a user comment field 390 where the user enters comments about the recipe 300. The user comment field 390 can be permanently stored and updated. The user comments are entered using the keyboard 150. In place of the keyboard 150, alternative acceptable data entry devices include a mouse, a pen sensitive screen, a touch pad, an externally accessed database and the like. Thus, the user can add personalized comments to any recipe 300, such as, for example, a preferred bottle of wine, a favorite side dish for an entree or a specific recipe modification, for example, an added or modified ingredient. By using the kitchen information management device 100, the additional user entered comments or information can be hygienically, consistently, and accurately maintained with each recipe 300.

In the illustrated embodiment, the controller 210 is implemented as a suitably programmed microcontroller in conjunction with one or more peripheral (e.g., integrated circuit) data and signal processing devices. Alternatively, the microcontroller could be implemented as a computer, e.g., a microprocessor, microcontroller or other processor device (CPU or MPU) or single special purpose integrated circuit (ASIC) having a main or central processor section for overall, system-level control, and separate sections dedicated to performing various different specific computations, functions and other processes under control of the central processor section. It will be appreciated by those skilled in the art that the microcontroller can also be implemented using a plurality of separate dedicated or programmable integrated or other electronic circuits or devices (e.g., hard-wired electronic or logic circuits such as discrete element circuits, or programmable logic devices such as PLDs, PLAs, PALs or the like). Alternatively, a distributed processing architecture could be used to maximize data/signal processing capability and speed.

Through the use of the removable IC cards 135 and the IC card ports 130, the kitchen information management device 100 can be updated and kept current with the user's changing nutritional requirements and eating preferences. Additional cookbooks stored on the IC data cards 135 and directed to, for example, ethnic foods, special meals, etc. are available through the IC card ports 130 for the user to search through and to select recipes 300 for use. Alternatively, the user can manually (or automatically) enter recipes into the user data store 240. Further, the kitchen information management device 100 can access additional reference materials, such as a larger glossary, nutritional information or utensil information using the removable IC cards 135 inserted into the IC card ports 130.

The control system 200 also includes one or more, and preferably five, count down timers 295. The count down timers 295 are used to count down various time events set forth in the preparation instructions 370 of the various stored recipes 300. In the preferred embodiment of the kitchen information management device 100, the timers 295 are set by selecting one of the cooking time data entries 340–346 of a recipe 300 and pressing the appropriate one of the variable function keys 160 or 160'. The next unused timer 295 is automatically set to the selected recipe cooking time. Pressing another appropriate one of the variable function keys 160 or 160' (or pressing the first key a second time) starts the selected timer 295 to begin counting down. Thus, the user sets the timers 295 for the recipes 300 using a minimal number of actions. Because the recipe cooking timers 295 are integrally combined with the cooking ingredients 360 and the preparation instructions 370, food preparation operations are easier and more efficient.

When the timer 295 counting down reaches zero, an alarm notifies the user. Preferably, the alarm includes a visual signal to the user with an accompanying unique audio signal. However, any type of visual or audio signal can be used either alone or in combination. Further, the user can set, clear, pause, start and restart the count down timers 295 using the variable function keys 160 or 160' and the cursor movement keys 170 or 170'.

The timers 295 can be provided independently of the microcontroller 210 or can be integrated into the microcontroller 210. The cooking time data 340–346 can be put into separate data fields within the recipes 300, as shown in FIG. 3, or can be embedded within the preparation instructions 370.

Figure 4:
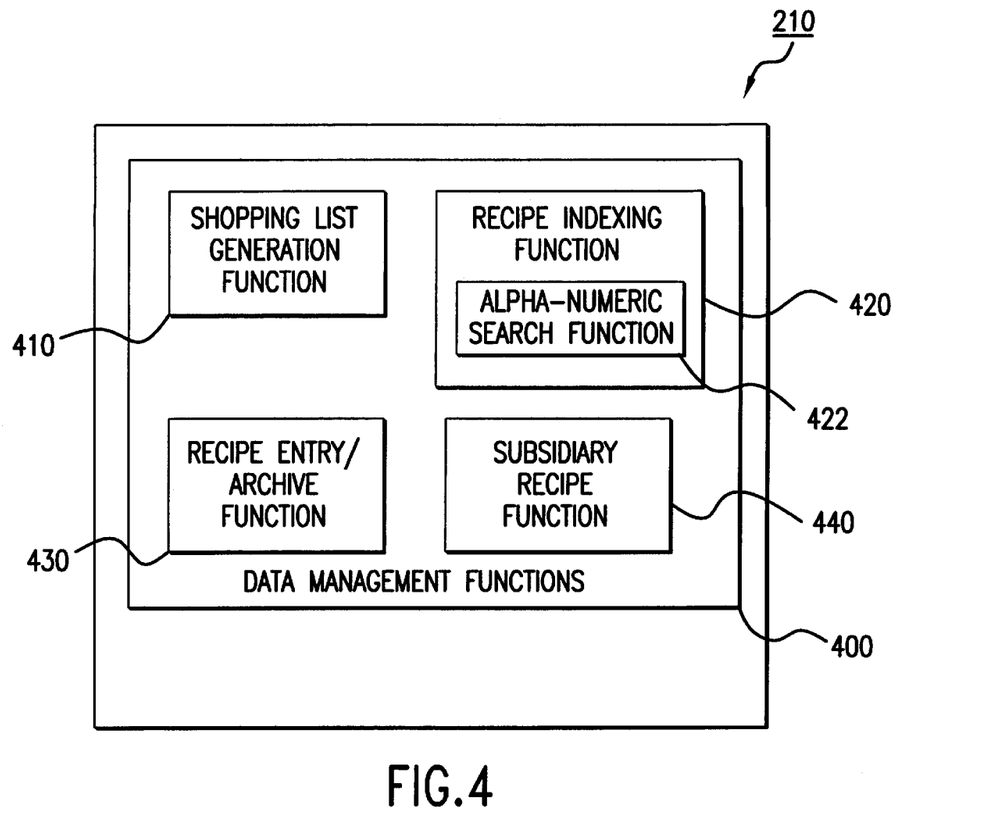
FIG. 4 shows a schematic function view of the data management functions performed by the microcontroller of FIG. 2.

As shown in FIG. 4, the microcontroller 210 of the control system 200 further includes a number of data management functions 400 which allow a user to manipulate the data in the recipes 300 stored in the predetermined recipe database 230 and/or stored in one or more IC cards 135 inserted into the IC ports 130. The user can manipulate the data using the keyboard 150, the variable function keys 160 or 160' and/or the cursor movement keys 170 or 170'.

In the illustrative embodiment of the kitchen information management device 100, the data management functions 400 include a shopping list generating function 410. The shopping lists generated by the shopping list generating function can be for a dish, meal, one or more days or a week. The shopping list generating function 410 avoids the problem of lost or illegibly handwritten shopping lists and/or duplicated or forgotten items from the shopping list. Further, shopping lists can be generated by data entry though the keyboard 150 or by selecting recipes and/or specific ingredients from recipes using the variable function keys 160 or 160' and the cursor movement keys 170 or 170'. The generated shopping list is preferably an aggregated list of ingredients. That is, identical items input to the shopping list generating function 410 are combined together to form a single list entry. Further, the individual shopping items can be individually deleted or have the associated quantity increased. Additional comments or information to be added to the shopping list can be entered through the keyboard 150. Such additional comments or information include schedule reminders or a cooking utensil that must be purchased in order to prepare a selected recipe.

The data management functions 410 further include a recipe indexing function 420. The indexing function 420 indexes the recipes 300 stored in the IC cards 135, the recipe database ROM 230 and the user data store RAM 240. Preferably, the recipe indexing function 420 indexes the recipes either by recipe title, main ingredient or recipe category. In addition, the user can scroll through a sequential listing of all available recipes.

The title is a unique recipe name and is stored in the title field 310 of the recipe 300. To find a recipe by its title, a title of a desired recipe is manually entered through the keyboard and an alpha-numeric search function 422 is used. The user then indicates where the indexing function 420 is to search for the title, in all available data stores or only in one or more of the recipe database ROM 230, the user data store RAM 240 or any inserted IC cards 135. The recipe indexing function 420 then searches the title fields 310 of the recipes 300 stored on the indicated data stores for the indicated recipe title.

The main ingredient is a unique set of mutually exclusive "primary ingredients", where each recipe has assigned to it a single main ingredient. This assigned main ingredient is preferably stored in the main ingredient field 330. Preferably, the predetermined recipe database 230 includes a preset main ingredients list, to which the user can add additional main ingredients. Likewise, each of the recipe databases 230 stored in the IC cards 135 will have a preset main ingredient list appropriate for the recipes stored in that IC card 135. When the user has selected one or none of the data stores, as outlined above, the recipe indexing function 420 compiles a master main ingredient list from the corresponding preset main ingredient lists. The recipe indexing function 420 then presents the compiled list to the user. The user selects one of the presented main ingredients using the function keys 160 or 160' and the cursor movement keys 170 or 170'. The recipe indexing function 420 then searches the main ingredient field 330 of the recipes in the selected data stores to locate all recipes 300 having the selected main ingredient. The recipe indexing function 420 then displays the titles, in sequence, of the recipes 300 having the selected main ingredient.

Similarly, the category for each recipe is a unique and mutually exclusive set of categories initially defined in the predetermined recipe database 230.

Each of the recipe databases 230 stored in the recipe database ROM 230, the user data store RAM 240, or the IC cards 135 has a preset category list appropriate for the recipes 300 stored in that data store. When the user has selected one or more of the data stores, as outlined above, the recipe indexing function 420 compiles a master category list from the corresponding preset category lists. The recipe indexing function 420 then presents the master category list to the user. The user selects one of the categories from the master category list using the function keys 160 or 160' and the cursor movement keys 170 or 170'. The recipe indexing function 420 then searches the category field 320 of the recipes 300 stored in the selected data stores to locate any recipe having the selected category. The recipe indexing function 420 then presents the titles, in sequence, of the recipes 300 having the selected category.

In addition, either of the category and the main ingredient searches can be performed by the recipe indexing function 420 on the recipes 300 located during the other of the category or main ingredient search. In this case, the recipe indexing function 420 compiles the master category or main ingredient list directly from the previously located recipes 300. Furthermore, the recipe indexing function 420 can directly compile the category or main ingredient master list for an initial search directly from the recipes in the selected data stores rather than from the preset search lists described above.

As described above, the recipe indexing function 420 displays an alphabetical list of selectable main ingredients and categories. When the user selects a specific main ingredient or category, the recipe indexing function 420 generates a list of recipes 300 satisfying the selected main ingredients or category. A secondary sort then preferably orders list of recipes 300 by the other of the category or the main ingredient. Thus, particular ones of the recipes 300 can be quickly located though the independent main ingredient index and the category index.

The data management function 400 also includes a new recipe entry/archive function 430, which allows a user to enter and/or archive recipes for permanent storage. To enter a new recipe, the recipe entry/archive function 430 displays a recipe entry form. The recipe entry form is a blank recipe form corresponding to the recipe 300 shown in FIG. 3 into which recipe information is entered through the keyboard 150. The recipe entry form is initially blank. The recipe entry form contains cursorable items corresponding to the recipe data fields shown in FIG. 3. Preferably, recipes entered through the recipe entry form are stored in a user personal recipe library database stored in the user data store RAM 240 or a writable IC card 135. Once saved, the newly entered recipe can be updated or deleted from the personal recipe library. optionally, the new recipe cannot be entered into the personal recipe library database until at least a mandatory subset of the recipe items, for example, the title, the category and the primary ingredient, are entered.

Figure 5:
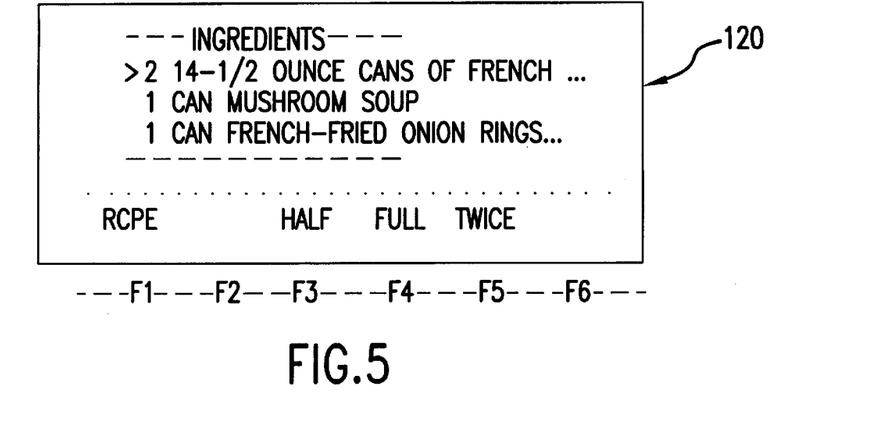
FIG. 5 is a drawing showing the screen displaying a main recipe.
Figure 6:
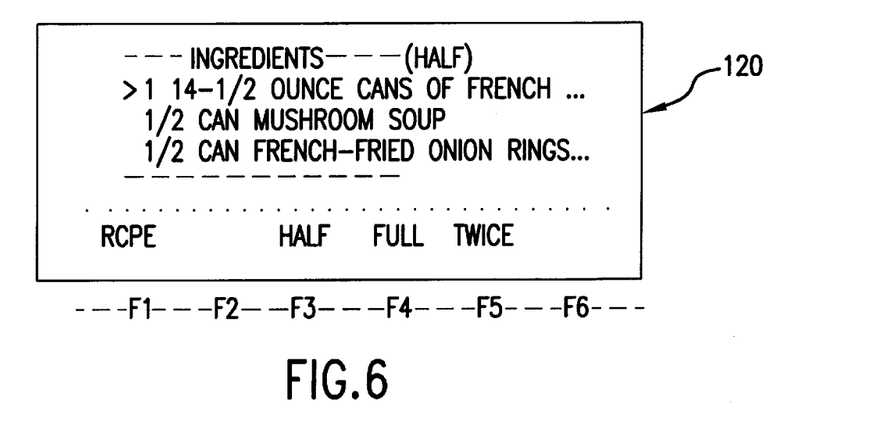
FIG. 6 is a drawing showing the screen displaying a halved recipe.
Figure 7:
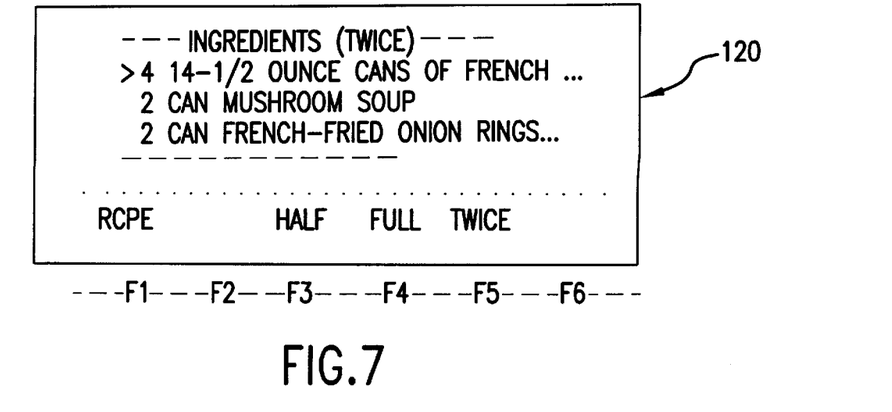
FIG. 7 is a drawing showing the screen displaying a doubled recipe.

The data management function 400 further provides for improved scaling of recipes by providing access to multiple versions of a single selected recipe 300. That is, a single recipe 300 includes a main recipe and at least one subsidiary recipe version accessed by a subsidiary recipe function 440 through a selected main recipe. Examples of subsidiary recipe versions are halved recipes and doubled recipes. That is, the recipes 300 Also stored stored in the data stores are main recipes. FIG. 5 shows the screen 120 displaying the ingredients list for a selected recipe. If "Half" is selected, the screen 120 displays the halved recipe as shown in FIG. 6. If "Twice" is selected, the screen 120 displays the doubled recipe as shown in FIG. 7. Preferably, the subsidiary recipes include only an ingredients list 360 and preparation instructions 370. Preferably, the ingredients list 360 of a subsidiary recipe lists only those ingredients whose quantity is different from the quantity used in the main recipe. Likewise, the preparation instructions of a subsidiary recipe preferably contains only those instruction that are different than in the main recipe, such as cooking time. When a main recipe 300 is selected that has one or more subsidiary recipes, the subsidiary recipe function 440 permits the user to access the subsidiary recipes.

Thus, each at least one subsidiary recipe has independent predetermined, non-arithmetically scaled variations of the ingredient quantities and individual preparation instructions relative to the main recipe. The subsidiary versions of the main recipe beneficially treat those ingredients, such as spices, oils and baking powder, which, when arithmetically scaled to arithmetically determine ingredient quantities, cause unsatisfactory cooking results. Similarly, some preparation instructions, such as cooking times, when arithmetically scaled do not produce acceptable cooking results.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A kitchen information management device, comprising:
   a control system;
   a display; and
   a plurality of stored recipes, wherein at least one of the stored recipes comprises:
   a main recipe having a first set of ingredients and a first set of preparation instructions, and
   at least one subsidiary recipe having at least one of a subsidiary set of predetermined ingredients and a subsidiary set of predetermined preparation instructions, each subsidiary recipe being a predetermined non-arithmetically scaled version of the main recipe.

2. The kitchen information management device of claim 1, wherein the subsidiary set of predetermined ingredients is an independent non-arithmetically scaled version of at least one of the first set of ingredients.

3. The kitchen information management device of claim 1, wherein the subsidiary set of predetermined preparation instructions is an independent non-arithmetically scaled version of at least one of the first set of preparation instructions.

4. The kitchen information management device of claim 1, further comprising a main menu, wherein only the main recipes can be displayed through the main menu, and each of the subsidiary recipes can be displayed only through the main recipe.

5. The kitchen information management device of claim 1, wherein each of the at least one scaled subsidiary recipes has at least one of the subsidiary ingredient quantities and the subsidiary preparation instructions being an independent predetermined, non-arithmetically scaled version of the corresponding one of the first set of ingredients and the first set of preparation instructions.

6. A method for managing kitchen information comprising the steps of:
   storing a plurality of recipes in a memory, wherein at least one of the stored recipes comprises:
   a main recipe having a first set of ingredients and a first set of preparation instructions, and
   at least one subsidiary recipe, each subsidiary recipe having at least one of a predetermined subsidiary set of ingredients and a predetermined subsidiary set of preparation instructions, each subsidiary recipe being a predetermined scaled version of the main recipe; and
   selecting one of the plurality of recipes, wherein each subsidiary recipe is selectable only when the corresponding main recipe is selected.

7. The method of claim 6, wherein the at least one subsidiary recipe includes at least one of a halved recipe and a doubled recipe.

8. The method of claim 6, wherein the first set of ingredients is displayed in a first format on the display and the first set of preparation instructions is displayed in a second format on the display, further comprising the step of flipping between the first format and the second format.

9. The method of claim 6, wherein each of the plurality of recipes has a main ingredient and a category, and further comprising the step of selecting at least one of the plurality of recipes by one of the main ingredient and the category.

10. The method of claim 9, further comprising the step of further selecting at least one of the at least one selected recipes by the other of the main ingredient and the category.

11. A method for managing kitchen information comprising the steps of:

displaying at least one of a plurality of recipes stored in a memory, the displayed recipe including at least one cooking time;

selecting one of the at least one cooking time;

selecting a cooking time timer from a plurality of cooking time timers;

automatically setting the selected cooking time timer to the selected cooking time;

initiating counting down of the selected cooking time timer; and energizing an alarm when the selected cooking time timer reaches zero.

12. The method according to claim 11, further comprising the steps of:

stopping the selected cooking time timer; and clearing the selected cooking time timer.

13. The method according to claim 11, wherein the counting down of the selected cooking time timer may be paused and restarted.

14. The method according to claim 13, further comprising the step of manually resetting the selected cooking time timer.

15. A device for managing cooking related information, comprising:

an information storage device storing a plurality of recipes;

a display device that displays at least one of the plurality of recipes stored in the information storage device, the displayed recipe including a cooking time; and a control system having a plurality of timers, the control system selecting one of the plurality of timers and automatically setting the selected timer based on the cooking time of the displayed recipe.

16. A method for managing kitchen information, comprising the steps of:

receiving a recipe selection identifying at least one selected recipe from a plurality of recipes stored in a memory, wherein the at least one selected recipe comprises:

a main recipe, each main recipe having a first set of ingredients and a first set of preparation instructions; and at least one subsidiary recipe, the at least one subsidiary recipe having at least one of a predetermined subsidiary set of ingredients and a predetermined subsidiary set of preparation instructions, wherein the subsidiary set of ingredients and subsidiary set of preparation instructions include only those ingredients and preparation instructions that differ from the main recipe, respectively; and displaying the selected recipe.

17. The method of claim 16, wherein the first set of ingredients is displayed in a first format on the display and the first set of preparation instructions is displayed in a second format on the display, further comprising the step of flipping between the first format and the second format.

18. The method of claim 16, wherein each of the plurality of recipes has a main ingredient and a category, and wherein the step of receiving a recipe selection includes receiving one of a main ingredient selection or category selection that selects at least one of the plurality of recipes by one of the main ingredient and category, respectively.

19. The method of claim 18, further comprising selecting at least one of the at least one selected recipes by the other of the main ingredient and the category.

* * * * *